United States Patent
Meitinger et al.

(10) Patent No.: US 8,955,345 B2
(45) Date of Patent: Feb. 17, 2015

(54) METHOD FOR OPERATING A MOTOR VEHICLE IN A SPORTS OPERATING MODE

(75) Inventors: Karl-Heinz Meitinger, München (DE); Stefan Ullmann, München (DE); Florian Bauer, Kinding (DE)

(73) Assignee: Audi AG, Ingolstadt (DE)

(*) Notice: Subject to any disclaimer, the term of this patent is extended or adjusted under 35 U.S.C. 154(b) by 0 days.

(21) Appl. No.: 14/233,092

(22) PCT Filed: Jun. 27, 2012

(86) PCT No.: PCT/EP2012/002692
§ 371 (c)(1),
(2), (4) Date: Apr. 10, 2014

(87) PCT Pub. No.: WO2013/010622
PCT Pub. Date: Jan. 24, 2013

(65) Prior Publication Data
US 2014/0331693 A1    Nov. 13, 2014

(30) Foreign Application Priority Data
Jul. 16, 2011 (DE) .................. 10 2011 107 540

(51) Int. Cl.
*B60H 1/32* (2006.01)
*B60K 11/02* (2006.01)

(52) U.S. Cl.
CPC .................... *B60K 11/02* (2013.01)
USPC .................. 62/244; 62/61; 62/239

(58) Field of Classification Search
USPC ............ 62/61, 115, 183, 239, 241, 243, 244
See application file for complete search history.

(56) References Cited

U.S. PATENT DOCUMENTS

| | | | | |
|---|---|---|---|---|
| 3,918,543 A | * | 11/1975 | Halem | 180/282 |
| 4,280,457 A | * | 7/1981 | Bloxham | 123/198 R |
| 5,038,728 A | * | 8/1991 | Yoshida et al. | 123/198 R |
| 5,507,153 A | | 4/1996 | Seto et al. | |
| 5,549,153 A | | 8/1996 | Baruschke et al. | |
| 5,875,761 A | * | 3/1999 | Fujieda et al. | 123/399 |
| 2008/0251235 A1 | | 10/2008 | Zhou | |
| 2010/0212338 A1 | | 8/2010 | Hermann et al. | |
| 2011/0295451 A1 | | 12/2011 | Fassnacht | |

FOREIGN PATENT DOCUMENTS

| | | |
|---|---|---|
| DE | 42 38 364 | 5/1994 |
| DE | 195 42 125 | 5/1996 |
| DE | 694 13 481 | 3/1999 |
| DE | 102007004979 | 8/2008 |
| DE | 102008054699 | 6/2010 |
| DE | 102009056027 | 4/2011 |
| DE | 102009059982 | 6/2011 |
| EP | 1 637 709 | 3/2006 |

OTHER PUBLICATIONS

International Search Report issued by the European Patent Office in International Application PCT/EP2012/002692 on Sep. 28, 2012.

* cited by examiner

*Primary Examiner* — Melvin Jones
(74) *Attorney, Agent, or Firm* — Henry M. Feiereisen LLC

(57) ABSTRACT

A method for operating a motor vehicle having at least one electric drive component which is cooled via at least one coolant circuit which is coupled thermally to a refrigerant circuit. In a first operating mode of the motor vehicle, an inlet temperature of a coolant of the at least one coolant circuit is set to a first value by active cooling by means of the refrigerant circuit. In a second operating mode, in particular a sports operating mode of the motor vehicle, the inlet temperature is lowered with respect to the first operating mode. As a result, more pronounced cooling of the components is made possible in the second operating mode, as a result of which the maximum driving power of the motor vehicle is increased.

9 Claims, 1 Drawing Sheet

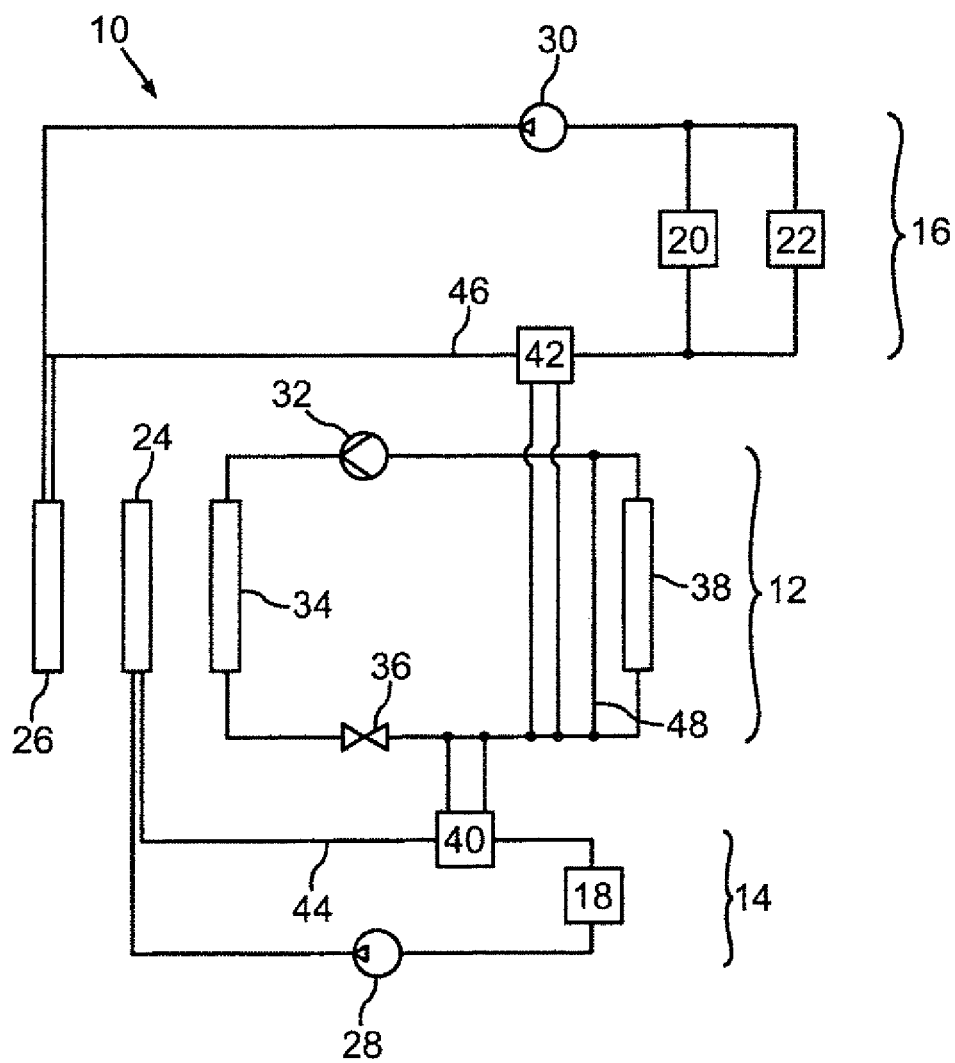

METHOD FOR OPERATING A MOTOR VEHICLE IN A SPORTS OPERATING MODE

CROSS-REFERENCES TO RELATED APPLICATIONS

This application is the U.S. National Stage of International Application No. PCT/EP2012/002692, filed Jun. 27, 2012, which designated the United States and has been published as International Publication No. WO 2013/010622 and which claims the priority of German Patent Application, Serial No. 10 2011 107 540.6, filed Jul. 16, 2011, pursuant to 35 U.S.C. 119(a)-(d).

BACKGROUND OF THE INVENTION

The invention relates to a method of operating a motor vehicle with at least one electric drive component, which is cooled via at least one cooling circuit.

The power output of electrically operated motor vehicles is largely determined by the thermal capacity of the electric drive components, such as motor, power electronics, DC-DC converter, battery and the like. Therefore, at least one coolant circuit is typically provided, by which heat can be removed from those components and discharged to the ambient air using a heat exchanger. To ensure additional cooling, this coolant circuit is also frequently coupled to a refrigerant circuit of the motor vehicle.

During the operation of the refrigerant circuit, a coolant is compressed and thereby liquefied, and then cooled via an ambient heat exchanger. A partial volume flow of the coolant is converted back into the gas phase in a first evaporator, thereby further cooling the coolant. Air which after exiting the evaporator is directed into the interior of the motor vehicle flows through this evaporator for climate control of the interior of the motor vehicle. Another partial volume flow passes through a second evaporator which is in thermal contact with the coolant circuit for cooling the electrical drive components. In this way, a flow temperature of the coolant in the coolant circuit can be set lower than the ambient temperature.

However, when the electric drive components are severely burdened, for example in a sports or racing operating mode of the motor vehicle, this is not always sufficient to ensure adequate cooling of the electric drive components. These can then only be operated with a predetermined constant power that is less than the maximum possible peak operating power. Although the continuous power can be exceeded during brief time periods, the power must be reduced again as soon as the electrical components have reached a predetermined maximum temperature.

SUMMARY OF THE INVENTION

It is therefore the object of the present invention to provide a method of the aforedescribed type, which allows the longest possible operation of the motor vehicle at a particularly high power output.

This object is achieved by a method of operating a motor vehicle with at least one electric drive component, which is cooled via at least one coolant circuit which is thermally coupled to a refrigerant circuit, wherein in a first operating mode of the motor vehicle, a flow temperature of a coolant of the at least one coolant circuit is set to a first value through active cooling with the refrigerant circuit, and in a second operation mode of the motor vehicle, the flow temperature of the coolant of the at least one the coolant circuit is set to a second, smaller value through active cooling with the refrigerant circuit.

In such a method, at least one electric driving component of the motor vehicle is cooled with at least one cooling circuit. This cooling circuit is initially designed for passive cooling, i.e. can only discharge the absorbed heat via an ambient heat exchanger to the ambient air. To improve the cooling performance, the at least one cooling circuit is thermally coupled to a refrigerant circuit of the motor vehicle, which is actively cooled and has a coolant compressor, at least one condenser and at least one evaporator. Through thermal coupling of the two circuits, a portion of the cooling power of the refrigerant circuit can be used to lower the flow temperature of the coolant in the at least one refrigerant circuit, i.e. the temperature at which the coolant enter the components to be cooled, below the ambient temperature.

According to the invention, in a first operating mode of the motor vehicle, the flow temperature is set to a first value and is set to a second value in a second operating mode, wherein the second value is smaller than the first value.

The lower flow temperature in the second operating mode allows the electric drive components of the motor vehicle to operate at a higher continuous power and to operate for a longer time at peak operating power than in the first operating mode, since the heat generated during operation can be better dissipated. Furthermore, the improved cooling increases the service life of the drive components.

Preferably, two coolant circuits are employed which can be used to set respective flow temperatures in respective the refrigerant circuit. In this way, different cooling requirements of the various drive components can be readily satisfied. Advantageously, the flow temperatures of the at least two coolant circuits may be different for each operating mode of the motor vehicle so that each of the cooled components can be brought to their respective optimum operating temperatures.

In another preferred embodiment, one of the coolant circuits is provided exclusively for cooling or temperature control of a high-voltage battery of the motor vehicle, because its demand on the operating temperature differs significantly from that of other drive components. In particular, a high-voltage battery may also require heating, for example when the ambient temperature is low.

Another cooling-medium circuit is preferably used for cooling power electronics and/or a DC-DC converter and/or a battery charger and/or an electric drive unit and/or a transmission. These components usually do not require heating at low ambient temperatures so that coupling to a heating device of the motor vehicle becomes unnecessary.

In a particularly preferred embodiment of the invention, in the second operating mode, the maximum cooling capacity of the coolant circuit is used to lower the flow temperature of the at least one refrigerant circuit. In other words, cooling power for climate control of the interior of the motor vehicle is no longer available in this operating mode. However, a particularly large increase in performance of the drive components can be realized with this reduction of comfort, so that this operating mode is particularly suitable for a sports or racing mode of the motor vehicle and may optionally be integrated into a corresponding sports or racing program of the motor vehicle.

Preferably, a total volume flow of a coolant in at least one coolant circuit is divided into at least two partial volume flows, which can each be used to cool different drive components. In this way, a different cooling power for different drive components can be achieved with the same flow temperature for the two partial volume flows, without requiring additional, separate coolant circuits.

It is particularly advantageous, when a different ratio of the partial volume flows to each other is adjusted in the two operating modes. This allows the different power-dependence of the cooling requirements of different components to be taken into account. For example, components having a relatively small thermal mass, such as power electronics, require relative more cooling at high loads than components with high thermal mass, such as the transmission. In this embodiment of the invention, an increased partial volume flow of the coolant may be supplied to the power electronics and like components in a sporty mode of the motor vehicle. This prevents the low thermal mass of such components from becoming a limiting factor for the maximum attainable constant power of the motor vehicle.

The invention furthermore relates to a motor vehicle, which is designed for carrying out the aforedescribed method. Such motor vehicle has a control element for a driver to select between the first and the second operating mode. The enhanced cooling of the components of the electric drive is thus provided in response to a driver request, so that the flow temperatures of the coolant circuits can be lowered already before the actual increased power requirement of the drive.

BRIEF DESCRIPTION OF THE DRAWING

The invention and its exemplary embodiments will now be explained in more detail with reference to the drawing, FIG. 1 shows a schematic diagram of a cooling system of a motor vehicle for use with an exemplary embodiment of the method according to the invention.

DETAILED DESCRIPTION OF PREFERRED EMBODIMENTS

A cooling system of a motor vehicle, generally designated with 10, includes a refrigerant circuit 12 as well as two coolant circuits 14, 16 for cooling of components 18, 20, 22 of an electric drive of the motor vehicle. The first coolant circuit 14 is used exclusively for cooling a high-voltage battery 18. The components 20, 22 cooled by the second coolant circuit 16 may include, for example, power electronics, a DC-DC converter, an electric drive motor or a gear. The use of two separate coolant circuits 14, 16 for the high-voltage battery 18 and for the other components 20, 22 is advantageous because the optimum operating temperature of the high-voltage battery 18 is significantly different from that of the components 20, 22.

Each of the coolant circuits 14, 16 has a heat exchanger 24, 26 through which air flows when the motor vehicle is moving, as well as a circulation pump 28, 30 for circulating the coolant. The coolant heated after passing through the components 18, 20, 22 can cool down again in the heat exchangers 24, 26 and dissipate the absorbed heat to the environment.

In the refrigerant circuit 12, the refrigerant is first compressed by a compressor 32 and then flows through has a heat exchanger 34 exposed to the air stream. The compressed and cooled refrigerant is then expanded via an expansion valve 36, whereby it is further cooled. The refrigerant finally absorbs in an evaporator 38 heat from an airflow used for climate control of the interior of the motor vehicle, thereby cooling the interior. The refrigerant is finally returned to the compressor 32 after passing through the evaporator.

In addition to controlling the climate of the interior, the refrigerant circuit 12 is also used to pre-cool the coolant in the coolant circuits 14 and 16. For this purpose, additional evaporators 40, 42 are provided, through which the refrigerant of the refrigerant circuit can be passed so as to cool the coolant in the respective flow lines 44, 46 of the coolant circuits 14, 16 before the coolant reaches the components 18, 20, 22. The respective flow rate of the refrigerant through the evaporators 38, 40, 42 can be adjusted individually for each evaporator with valves, which are not shown in the FIGURE.

In particular in electrically powered vehicles, the maximum power output of the drive is limited by the thermal load capacity of the components 18, 20, 22 of the drive, and thus by the cooling power of the coolant circuits 14, 16. This cooling power can be increased through additional pre-cooling of the coolant in the flow lines 44, 46, allowing the drive to provide more power.

For reasons of comfort, the refrigerant of the refrigerant circuit 12 is in the normal operation of the motor vehicle conducted predominantly or exclusively through the evaporator 38 for allowing an optimal climate control of the interior. However, when the driver of the motor vehicle desires a particularly sporty driving experience, he can select a sports or racing mode with a control element in the cockpit of the motor vehicle. A control unit of the motor vehicle receives a corresponding signal, and controls the pumps and valves of the cooling system so that, in this operation mode of the motor vehicle, the refrigerant is conducted mainly through the evaporators 40, 42, so as to particularly strong pre-cool the coolant in the flow lines 44, 46. If necessary, the evaporator 38 controlling the interior climate may in this operating mode be completely bypassed by a bypass line 48. The particularly good heat dissipation of the components 18, 20, 22 makes it possible to exceed the maximum operating performance in normal operation and to realize the desired sporty behavior of the motor vehicle.

In addition to lowering the flow temperature of the coolant in the coolant circuits 14, 16, further measures may be taken to improve the cooling in the sports mode. For example, different volume flows of coolant may be supplied to the parallel components 20, 22 in the coolant circuit 16. If, for example, the component 20 is a device with a particularly low thermal mass, such as power electronics, then this component 20 would overheat more quickly at high load than the component 22. This may be prevented in the sports operating mode by increasing the partial volume flow of coolant cooling the component 20 in relation to the partial volume flow cooling the component part 22 in order to prevent the component 20 from overheating.

Altogether, a method is provided which enables particularly efficient cooling of the components 18, 20, 22 of the electric drive of the motor vehicle when a sports operating mode is selected. In this operating mode, a significantly increased drive power can therefore be attained compared to the normal operation.

The invention claimed is:
1. A method of operating a motor vehicle with at least one electric drive component, which is cooled via at least one coolant circuit that is thermally coupled to a refrigerant circuit, the method comprising:
    allowing a driver of the motor vehicle to select via a control element between a first operating mode designed as a normal operating mode and a second operating mode designed as a sports operating mode,
    in the first operating mode of the motor vehicle, setting a flow temperature of a coolant of the at least one coolant circuit to a first value through active cooling with the refrigerant circuit, and in the second operation mode of the motor vehicle, setting the flow temperature of the coolant of the at least one coolant circuit to a second, smaller value through active cooling with the refrigerant circuit.

2. The method of claim 1, wherein respective flow temperatures are set in at least two cooling circuits with the refrigerant circuit.

3. The method of claim 2, wherein the respective flow temperatures of the at least two coolant circuits are different from each other.

4. The method of claim 1, wherein the at least one coolant circuit is used solely for cooling a high-voltage battery of the motor vehicle.

5. The method of claim 1, wherein an additional coolant circuit is used for cooling at least one of power electronics, a DC-DC converter, a battery charger, an electric drive unit, and a transmission.

6. The method of claim 1, wherein in the second operating mode, the maximum cooling power of the refrigerant circuit is used for decreasing a flow temperature of the at least one coolant circuit.

7. The method of claim 1, wherein in the at least one coolant circuit, a total volume flow of coolant is divided into at least two partial volume flows, which are each used to cool different drive components.

8. The method of claim 7, wherein a flow ratio between the at least two partial volume flows is adjusted differently commensurate with the two operating modes.

9. A motor vehicle, comprising:
a control element allowing a driver to select between a first operating mode and a second operating mode, wherein the motor vehicle is configured to carry out a method of operating a motor vehicle with at least one electric drive component, which is cooled via at least one coolant circuit that is thermally coupled to a refrigerant circuit, by:
allowing a driver of the motor vehicle to select via a control element between the first operating mode designed as a normal operating mode and the second operating mode designed as a sports operating mode,
in response to selection of the first operating mode of the motor vehicle, setting a flow temperature of a coolant of the at least one coolant circuit to a first value through active cooling with the refrigerant circuit, and
in response to selection of the second operation mode of the motor vehicle, setting the flow temperature of the coolant of the at least one coolant circuit to a second, smaller value through active cooling with the refrigerant circuit.

* * * * *